July 19, 1949.  C. O. GUERNSEY  2,476,367
LEAF SPRING FOR LOW INTERLEAF FRICTION
Filed June 28, 1946
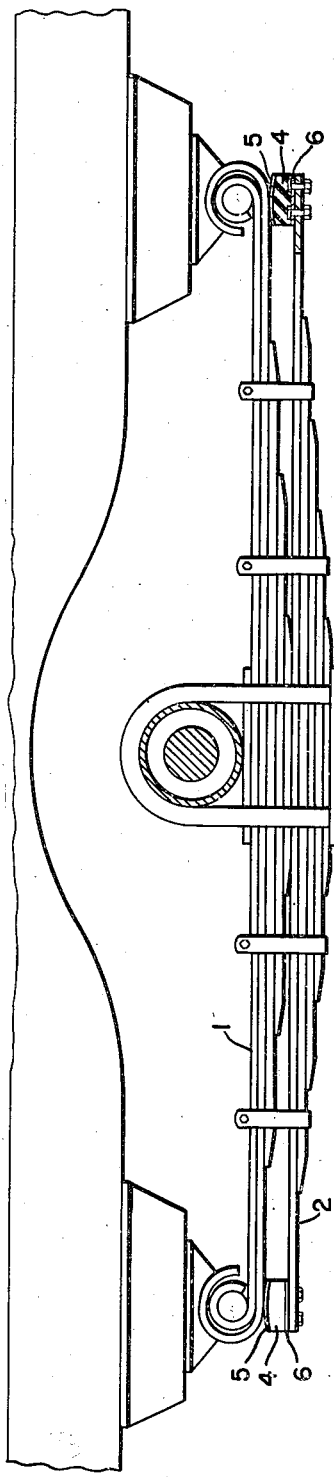
FIG. 1
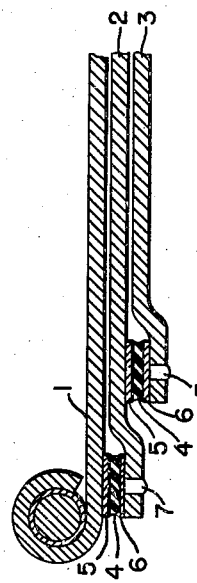
FIG. 4
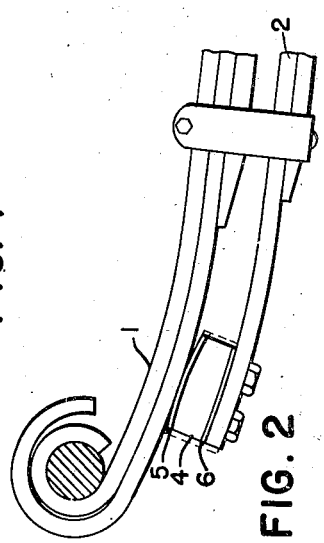
FIG. 2
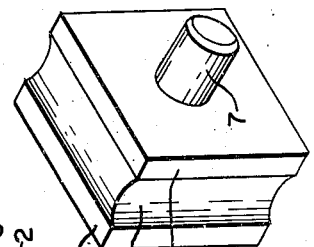
FIG. 5
FIG. 6
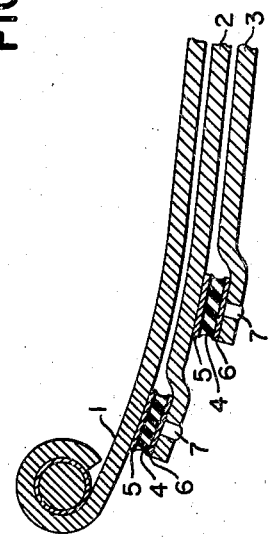
FIG. 3
INVENTOR
CHARLES O. GUERNSEY
BY
Toulmin & Toulmin
ATTORNEYS

UNITED STATES PATENT OFFICE 2,476,367

LEAF SPRING FOR LOW INTERLEAF FRICTION

Charles O. Guernsey, Indianapolis, Ind., assignor to Marmon-Herrington Company, Inc., Indianapolis, Ind., a corporation of Indiana Application June 28, 1946, Serial No. 680,046

4 Claims. (Cl. 267—49)

My invention relates to shock absorbing means and a method of absorbing shock, particularly on vehicles. In particular my invention relates to a leaf spring with mechanism for low interleaf friction.

The typical leaf spring such as those used regularly for trucks, buses and some passenger cars, as well as railroads and other equipment, has been the subject of criticism because of the excessive dampening effect arising from the friction involved when one leaf is required to slide over another. This condition is particularly undesirable in that the static friction inherent in this arrangement retards the breakaway at the initiation of a deflection of the spring and is much higher than the sliding friction once the movement between the spring elements has been initiated and takes place. The resulting effect, therefore, is for the spring to tend to resist any deflection on a relatively small actuating force. The result is that the friction involved in small amplitude movements as in the so-called boulevard ride, is much greater than the interleaf friction under higher amplitudes.

The foregoing is exactly the reverse of the condition desired for successful and comfortable spring operation. The spring should have a minimum of dampening when operating under small motivating forces and low amplitudes, with increased dampening under higher amplitudes and higher motivating forces.

The result of these conditions and objections has been in many cases designers have resorted to low friction suspension such as coil springs or rubber, superimposing shock absorbers for the purpose of dampening. This is both expensive and generally unsatisfactory.

It is the object of the present invention to eliminate the foregoing objections and difficulties and to provide a yielding, resilient shock absorbing and cushioning element which controls the interaction of the spring elements as in a leaf spring.

It is an object to provide an elastic element between the elements of the spring, positively carried with one element of the leaf spring and in frictional engagement with another element of the leaf spring.

It is an object of this invention to provide that under small amplitudes of movement, the elastic element will be deformed in shear. Thus, within the limits of such amplitudes, the movement will be comparatively frictionless. If, however, the amplitude is sufficiently great, the resistance of the resilient element to excessive deformation will then cause it to slide on the next adjacent leaf, thus introducing a dampening value.

It is an object to provide, by selecting the proper proportions, particularly the thickness of the elastic element, a means of determining the amplitude of vertical movement which can be achieved with a minimum of interleaf friction.

It is an object to secure a very soft ride under low amplitudes, but with interleaf dampening at high amplitudes.

It is an object to thus provide a mechanism that will provide a very satisfactory ride without the need of external dampening, such as shock absorbers.

It is an object to provide such resilient elements to transmit the load from the lower half of the spring into the eyes without going through the interleaf friction points of leaves in the upper half of the spring. This, of itself, materially reduces total interleaf friction.

It is an object of this invention to provide the combination of low friction at small movements with an increased friction at higher movements.

It is an object of the invention to provide the application of this principle to both rotary for oscillating parts and to parts as shown in the drawings of this application.

Referring to the drawings:

Figure 1 is a side elevation, partially in section, showing a leaf spring as compressed in the high amplitude movement.

Figure 2 shows a similar view in which the movement taking place as indicated by the dotted lines is of small amplitude. In this condition the resilient, shear element is absorbing the minor amplitude of movement.

Figure 3 is a section through one end of the leaf spring and the resilient, shear element showing the arrangement of such element when the spring is in its normal position as shown in Figure 2.

Figure 4 is a similar view to Figure 3 showing the arrangement of the elements as a result of the full compression of the leaf spring.

Figure 5 illustrates the movement of small amplitudes as in the case of Figure 2 and Figure 3 where that movement has extended sufficiently to cause the shear of the resilient element which is retained at its base on one leaf of the spring and is in frictional engagement at the top with another leaf of the spring.

Figure 6 is a perspective view of the shear element of this invention.

Referring to the drawings in detail, 1 repre- sents a typical main leaf with attaching eye, 2 and 3 represent typical supporting leaves. Between each of these supporting leaves and the leaf next above is a bearing element having an elastic medium such as rubber as indicated at 4. This elastic element, in each case, is vulcanized to its metal back plates 5 and 6 and is caused to adhere by suitable rubber adhesion methods.

Any suitable means may be utilized for mounting and retainnig this rubber shear element on one of the leaf springs as for instance the use of the dowel pin 7 which extends through a hole in one of the supporting leaves.

In the deflection of the spring, there is a tendency for an endwise movement between the leaves 1 and 2, 2 and 3, etc. The extent of this movement varies with the amplitude of a vertical deflection of the spring.

It is contemplated that under small amplitudes of movement, the elastic element 4 will be deformed in shear as shown in Figure 5. Thus, in the limits of such amplitudes, the movement is comparatively frictionless. If, however, the amplitude be sufficiently great, the resistance of 4 to excessive deformation will then cause the metal plate 5 which is mounted upon and attached to the rubber block 4 to slide on the next adjacent leaf, as at 1 or 2, thus introducing a dampening result.

It will be apparent that the selecting of the proper proportions, particularly the thickness of the elastic element, the amplitude of vertical movement can be determined and the result achieved with a minimum of interleaf friction. Thus it is possible to secure a very soft ride on the low amplitudes, but with the usual interleaf dampening at high amplitudes. Under certain applications, this makes possible a very satisfactory ride without the need of external dampening mechanism. In other words, by absorbing minor movements through the rubber shear block, secondary movements through friction between the metal cover of the rubber shear block and the adjacent leaf spring and by permitting full frictional engagement between the leaves in the case of major movements it is possible to adjust the spring suspension and its shock absorbing qualities to a wide variety of differing types of movement to thereby give the satisfactory ride desired.

In the drawings a comparatively simple application is illustrated where the elements are used to transmit the load in the lower half of the spring into the eyes without going through the interleaf friction points of leaves in the upper half of the spring. This, of itself, materially reduces total interleaf friction.

For instance in a conventional spring having 10 leaves, it is reasonably accurate to assume that the main leaf of itself would carry approximately 10% of the load. This leaves 90% of the load to be transmitted from the supporting leaves into the main leaf at the point of bearing between the main and the supporting leaves.

In practice this bearing supports principally at the ends of the leaves. In similar fashion 80% of the load is transmitted between the second and third leaf, 70% between the third and fourth and so on so that the accumulative value of loads transmitted to friction points represents, in this instance, four and a half times the total load on the spring.

By dividing the spring as shown in the drawings and neglecting the effect of the wrapper leaf, the top half and the bottom half of the spring are each presumed to carry 50% of the load. The second leaf would carry 40%, the third 30%, etc. so that each half transmits thorugh the friction point one times the total load carried or the total for the two springs of a force equal to twice the load carried so that the total interleafed friction becomes 45% of that occurring with conventional springs 12.

If the anti-friction shear blocks 4 are made of the proper thickness, additional dampening can be introduced by forcing the friction block at metal element 5 to slide on the leaf next above wherever the movement exceeds a certain amplitude.

While it is recognized the use of anti-friction materials between leaves of the spring is not per se new, yet this instant invention goes beyond any such suggestion and provides a novel combination of low friction at small movements with an increased friction at higher movements.

For instance, Figures 1 and 2 represent one form of embodiment of the invention, while Figures 3 and 4 show a different arrangement. In Figures 1 and 2 the resilient element is not located between the various adjacent leaves, but only a single element is provided between the top and bottom halves of the two-part spring. It will be understood that the deformation of the resilient member 4 takes place in the same manner as illustrated in Figure 5. This application can reduce interleaf friction to approximately 45% of that found in a normal spring where a total of ten leaves is involved. It will be understood that the exact percentage varies with total thickness, that is, the number of leaves.

It will be understood that I desire to comprehend within my invention the movement of two pieces of metal with respect to one another that are resiliently interconnected, the movement of the metal being resisted by the shear action upon the interconnecting resilient block or sleeve, so that the combined action of the resistance compression of the rubber and the resistance to shear in connection with the lateral movement of metal elements and the movement of the metal elements to and from one another provides a broadly new shock absorbing and shock controlling arrangement.

It will be understood that my invention is adaptable to a wide variety of uses and conditions and I desire to comprehend within the appended claims and the scope thereof such variations as may be necessary to adapt this invention to varied conditions of use.

I claim:

1. A leaf spring construction comprising a plurality of leaves, certain of said leaves being of shorter length than others of said leaves, an elastic shear element of sandwich construction comprising a central block of resilient material and upper and lower metal plates vulcanized to said resilient material whereby to expose for shearing movement the open sides of said central block of resilient material, means attaching one of said plates of said shear element to one of said leaves against longitudinal movement of said element, and in position where the other of said metal plates slidably engages the adjacent leaf of said spring, said adjacent leaf being longer than said one leaf whereby under a small amplitude of movement the central block of resilient material will be deformed in shear and under a sufficiently great amplitude of movement and excessive deformation of said resilient element of said block, said other metal plate of said block will slide on the leaf engaged by it.

2. A leaf spring construction including a two-part spring, each part comprising a plurality of leaves, certain of said leaves being of shorter length than others of said leaves of each part, an elastic shear element of sandwich construction comprising a central block of resilient material and upper and lower metal plates vulcanized to said resilient material whereby to expose for shearing movement the open sides of said central block of resilient material, means attaching one of said plates of said shear element to one of said leaves of one part of said two-part spring against longitudinal movement of said element, and in position where the other of said metal plates slidably engages the adjacent leaf of the other part of said two-part spring, said adjacent leaf being longer than said one leaf whereby under a small amplitude of movement the central block of resilient material will be deformed in shear and under a sufficiently great amplitude of movement and excessive deformation of said resilient element of said block, said other metal plate of said block will slide on the leaf engaged by it in order that one part of said spring may move relatively to the other part thereof.

3. A leaf spring construction comprising a plurality of leaves, certain of said leaves having steps on the ends thereof, said stepped leaves being shorter than the other of said leaves, a plurality of elastic shear elements of sandwich construction each comprising a central block of resilient material and upper and lower plates vulcanized to said resilient material whereby to expose for shearing movement the open sides of said central resilient block, means attaching each of said elements to a step of said stepped leaves against longitudinal movement and in position where the other of the metal plates of each element slidably engages the adjacent leaf of said spring whereby under a small amplitude of movement each of said central blocks of each element will be deformed in shear and under a sufficiently great amplitude of movement and excessive deformation of the said resilient blocks of each element, said other metal plate of said element will slide on the leaf engaged by it.

4. A leaf spring construction comprising a plurality of leaves, at least one of said leaves being longer than the others of said leaves and provided with an eye at each end, an elastic shear element of sandwich construction comprising a central block of resilient material and upper and lower metal plates vulcanized to said resilient material whereby to expose for shearing movement the open sides of said central resilient block, means for attaching one of said plates of said shear element to one of said other leaves against longitudinal movement thereof and in position where the other of said metal plates slidably engages the said leaf provided with eyes whereby under a small amplitude of movement said central resilient block of said element will be deformed in shear and under a sufficiently great amplitude of movement and excessive deformation of said block, said other metal plate of said block will slide on the said leaf provided with eyes and which is engaged by said other metal plate.

CHARLES O. GUERNSEY.

REFERENCES CITED

The following references are of record in the file of this patent:

UNITED STATES PATENTS

| Number | Name | Date |
| --- | --- | --- |
| 1,783,193 | Matthews | Dec. 2, 1930 |
| 1,792,038 | Rossi | Feb. 10, 1931 |
| 2,346,092 | Tollzien | Apr. 4, 1944 |
| 2,407,236 | Heiney | Sept. 10, 1946 |

FOREIGN PATENTS

| Number | Country | Date |
| --- | --- | --- |
| 13,459 | Australia | 1928 |
| 313,181 | Britain | June 10, 1929 |
| 813,345 | France | Feb. 22, 1937 |